(No Model.)  2 Sheets—Sheet 1.

W. H. JENKS.
VALVE FOR ENGINES.

No. 517,863. Patented Apr. 10, 1894.

ON 2-2

ON 3-3

Witnesses,
Sidney P. Hollingsworth
Milton O'Donnell

Inventor,
William H Jenks
by his attorneys
Baldwin Davidson & Wight (No Model.) 2 Sheets—Sheet 2.
W. H. JENKS.
VALVE FOR ENGINES.
No. 517,863. Patented Apr. 10, 1894.
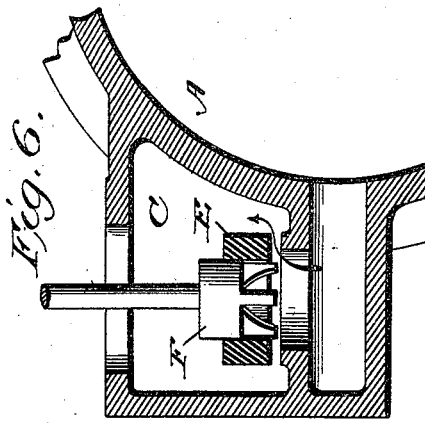
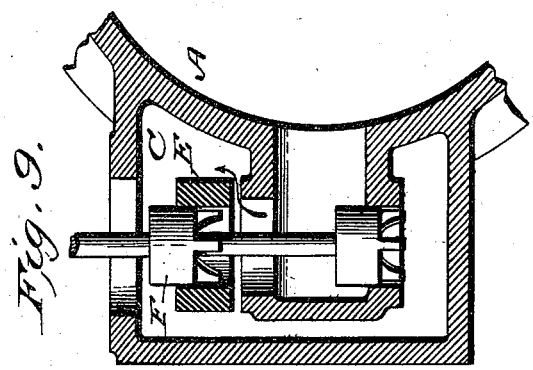
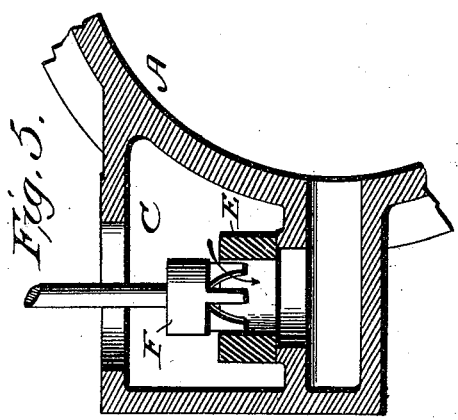
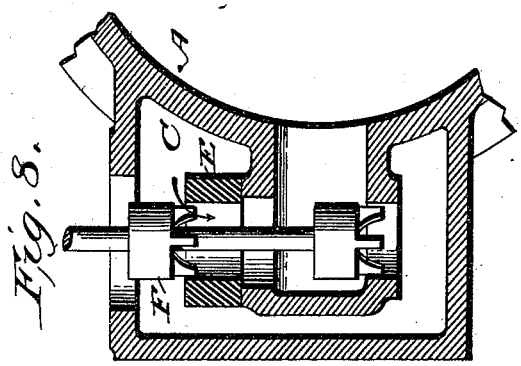
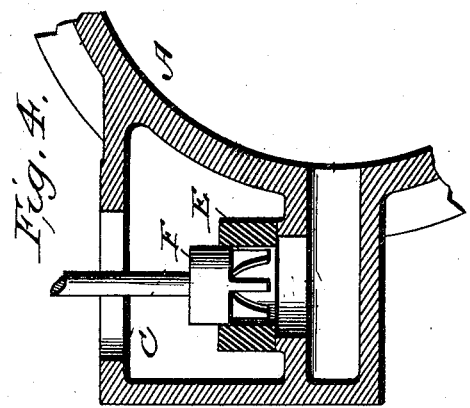
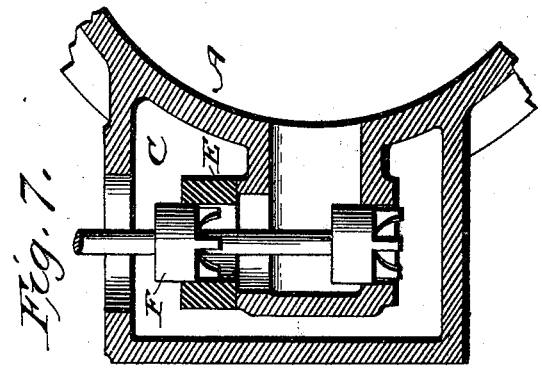
Witnesses
Inventor
William H. Jenks.
By Attorneys
Baldwin Davidson Wight

UNITED STATES PATENT OFFICE.

WILLIAM H. JENKS, OF BROOKVILLE, PENNSYLVANIA.

VALVE FOR ENGINES.

SPECIFICATION forming part of Letters Patent No. 517,863, dated April 10, 1894.

Application filed June 10, 1893. Serial No. 477,233. (No model.)

*To all whom it may concern:*

Be it known that I, WILLIAM H. JENKS, a citizen of the United States, residing at Brookville, in the county of Jefferson and State of Pennsylvania, have invented certain new and useful Improvements in Valves for Fluid-Pressure Engines, of which the following is a specification.

The object of my invention is to provide improved means for relieving the pressure in the cylinder of an engine, where steam or other fluid is admitted to the cylinder through piston valves, or valves of that class. According to my present invention, I provide a sleeve which forms a relief valve which is loosely mounted in the valve chest in such manner that it will form a tight joint with the cylinder when in place against its seat, and will yet be free to move away from its seat in a direction parallel to the direction in which the valve moves, to relieve excessive pressure. The piston valve reciprocates through the sleeve.

Figure 1:
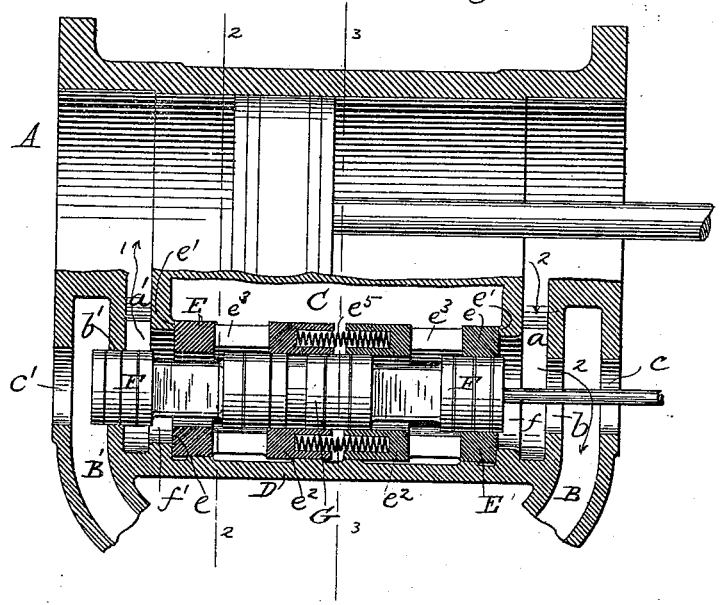
Figure 2:
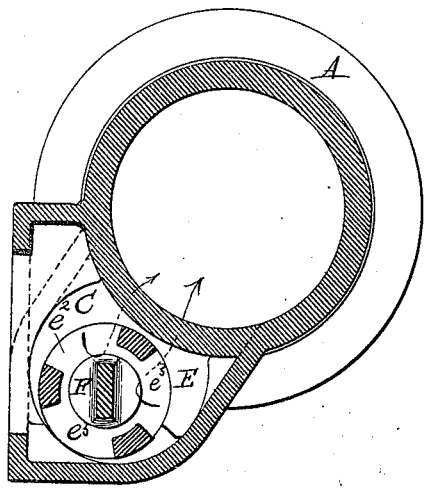
Figure 3:
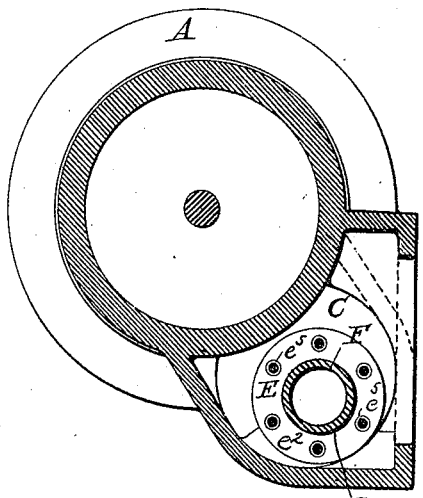

In the accompanying drawings,—Figure 1 is a view in longitudinal section, of so much of an engine, such as a steam engine, as is necessary to illustrate my improvements. Fig. 2 is a transverse section on the line 2—2 of Fig. 1. Fig. 3 is a transverse section on the line 3—3 of Fig. 1. Figs. 4, 5 and 6 are detail views in section, of modifications of my invention showing the valves in different positions. Figs. 7, 8 and 9 are similar views, showing a further modification, in which balanced valves are employed.

I will describe my improvements as embodied in a steam engine, and will describe them as operating when steam is employed, but I wish it understood that I do not limit my invention to steam engines, although it is specially designed for them.

Referring first to Figs. 1, 2 and 3, the cylinder A, has ports $a$ $a'$ at opposite ends communicating with exhaust ports B B', and with the steam chest C. The steam chest is provided with a case or support D, for the relief sleeves or valves E, through which the reciprocating valve F extends. The ports $a$ $a'$ communicate with openings $f f'$ leading into the steam chest, and with openings $b$ $b'$ leading to the exhaust passages B B'. The ends of the cylinder A, and the openings $c$ $c'$ may be closed in any suitable way. The sleeves E E' are each shown as formed with an annular head $e$, adapted to rest against a seat $e'$, at the opening $f$ or $f'$. Each sleeve is also provided with a socketed head $e^2$, and with openings $e^3$, through which the steam passes from the steam chest into the bore of the sleeve. The sleeves form a part of the valve cylinder, and lie loosely in the supports D, which are bored to receive them, and hold them concentric with the openings $b$ $b'$. At their outer ends, the sleeves are faced to form a steam-tight joint with the seats $e'$ $e'$, surrounding the openings $f$ $f'$. They are held against these seats by the springs $e^5$, and by the pressure of the steam in the steam chest. The central portion G, of the valve acts merely as a support to help carry the weight of the valves, and it is preferably made hollow to reduce its weight, as well as to give a freer passage to the steam. In the position of the valve, shown in Fig. 1, the port $a$ is closed to the admission of live steam, while the port $a'$ is open. The exhaust at $b'$ is closed, while the exhaust at $b$ is open. Steam passing through the openings $e^3$ will enter the cylinder through the port $a'$, as shown by arrow No. 1, while steam is exhausted through the port $a$ and opening $b$ into exhaust passage B, as indicated by arrow No. 2. As the piston nears the end of its stroke, the valve F moving in the same direction, will first close the exhaust opening $b$ and then continuing its motion, will, a little later, admit steam to the port $a$, from the steam chest C. If, during the period of compression, viz., the period during which both $b$ and $f$ are closed, the pressure in this end of the cylinder rises too high, this pressure acting on the exposed end of the sleeve E, will force it back from its seat, and thus relieve the pressure in the cylinder. The tension of the springs $e^5$, and the thickness of the sleeve or the width of its exposed face may be so proportioned that the sleeve will open only when a pre-determined pressure is reached. It will be observed that the sleeves really act as supplemental valves or relief valves to relieve the abnormal pressure in the cylinder.

Figs. 4, 5 and 6 show my improvements embodied in unbalanced valves. Similar letters of reference indicate similar parts as those shown in Fig. 1. As indicated in Figs. 4, 5 and 6, the weight of the sleeve is sufficient to normally hold it on its seat, and the steam will take the direction indicated by arrows. If, however, an abnormal pressure occurs in the cylinder, as above mentioned, the sleeve will be raised from its seat, as indicated in Fig. 6, while the valve is closed, and thus the pressure will be relieved. The valves and the sleeves will act in a similar manner when balanced valves are employed, as shown in Figs. 7, 8 and 9. In each instance the sleeve or relief valve is normally stationary, and the reciprocating valve which governs the admission moves independently of, or without moving the relief valve.

I claim as my invention—

1. A fluid pressure engine provided with a cylinder, a valve chest, one or more relief valves, and one or more reciprocating valves which pass through the relief valve or valves, and govern the admission of steam or other fluid.

2. A fluid pressure engine provided with a cylinder, a valve chest, and a reciprocating valve or valves governing the admission of steam and provided also with a sleeve or relief valve through which the reciprocating valve passes, and means for normally holding the relief valve on its seat.

3. The combination of the cylinder, the fluid chest, ports leading from the fluid chest to both ends of the cylinder, passages connecting the exhaust passages with the ports at the ends of the cylinder, a valve chest, relief valves within the valve chest provided with springs for holding them on their seats, and a reciprocating valve extending through the relief valves.

In testimony whereof I have hereunto subscribed my name.

WM. H. JENKS.

Witnesses:
J. W. WALKER,
F. J. HALL.